United States Patent Office 2,975,211
Patented Mar. 14, 1961

2,975,211

PRODUCTION OF TRICHLOROBENZOIC ACID

Theodore A. Girard, Wayne Township, Passaic County, N.J., assignor to Heyden Newport Chemical Corporation, a corporation of Delaware No Drawing. Filed Mar. 21, 1955, Ser. No. 495,782

9 Claims. (Cl. 260—523)

The present invention relates to the production of trichlorobenzoic acid from trichlorobenzyl chloride and is primarily concerned with the production of 2,3,6-trichlorobenzoic acid although its principles are applicable to production of the other isomers, particularly the 2,6 substituted isomers.

The trichloro-substituted benzyl chlorides are relatively difficult to oxidize to the corresponding substituted benzoic acids. The tri-substitutions in the ring decrease the reactivity of the side chain (—$CH_2Cl$) and this is especially true of the trichloro-isomers substituted in the 2 and 6-positions such as 2,3,6-trichlorobenzyl chloride. Accordingly, it is difficult to produce 2,3,6-trichlorobenzoic acid which is a useful herbicide.

I have discovered that 2,3,6-trichlorobenzoic acid can be produced from 2,3,6-trichlorobenzyl chloride by hydrolyzing the chloride to form a 2,3,6-trichlorobenzyl hydrolysate which can then be oxidized with nitric acid to form 2,3,6-trichlorobenzoic acid. The other isomers of trichlorobenzyl chloride can be reacted in the same manner to form the other isomers of trichlorobenzoic acid. The process is essentially a two step process in which the trichlorobenzyl chloride is first hydrolyzed by reaction with sodium hydroxide or other strongly alkaline, metal hydroxide, such as potassium or calcium hydroxide, while dissolved in a solvent. A solvent for the trichlorobenzyl chloride is used to speed the reaction and, for example, a water soluble alcohol, such as the aliphatic monohydric alcohols containing 1-3 carbon atoms, may be used. The reaction mixture preferably should contain some water for while the reaction can in theory proceed under anhydrous conditions, some water is desirable to allow the formation of sodium and hydroxyl ions. Only a very small amount of water is necessary although an excess does no harm. The sodium hydroxide may be formed in situ, for example, by adding sodium methylate to water. Apparently, the primary reaction during hydrolysis involves formation of the alcohol as follows:

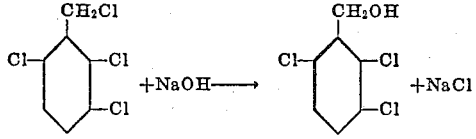

However, it is recognized that other reactions involving hydrolysis probably take place and di(2,3,6-trichlorobenzyl) ether as well as 2,3,6-trichlorobenzyl methyl ether may be produced. One advantage of the present process is that the crude hydrolysate need not be treated to separate or purify the 2,3,6-trichlorobenzyl alcohol and may be oxidized directly to the corresponding benzoic acid without separation into its components. The amount of metal hydroxide used is preferably at least equivalent to one mole of sodium hydroxide per mole of trichlorobenzyl chloride.

The hydrolysate is oxidized with concentrated nitric acid. Preferably 60-85% nitric acid is used. At least the minimum concentration is used to obtain the higher yields while higher concentrations tend to cause undesirable nitration. About 70% nitric acid is preferred. The percentage figure used refers to the amount of nitric acid actually present with the remainder being water plus the small amount of impurities which may be present in commercial grades of nitric acid. The term "70% nitric acid," for example, refers to an acid containing, by weight, about 70% nitric acid and about 30% water. Of course a more highly concentrated nitric acid can be diluted with water to provide 60–85% nitric acid.

The amount of nitric acid required depends upon the amount of hydrolysate and about 6 moles of nitric acid per mole of hydrolysate, calculated as 2,3,6-trichlorobenzyl alcohol, is preferred in order to obtain desirable yields. Much larger quantities of nitric acid may be used. While lower ratios down to about 4:1 may be used, the yield is appreciably reduced as the ratio of nitric acid to hydrolysate is reduced.

A solvent for the hydrolysate may be used during oxidation. The solvent increases the solubility of the hydrolysate and the rate of reaction. It should be substantially non-reactive with the nitric acid and for example, the saturated, monocarboxylic lower aliphatic acids containing one to four carbon atoms may be used.

A finely divided, inert inorganic material such as fuller's earth may be used to increase the yield of 2,3,6-trichlorobenzoic acid. The amount of inert material may vary over a wide range, for example, 5–15% based on the weight of hydrolysate although smaller or much larger amounts may be used. The inert material is substantially non-reactive and apparently functions as a dispersing and/or activating agent.

As used herein and unless clearly stated differently, the yield is based on the weight of trichlorobenzyl chloride charged to the reaction. Where a mixture of trichlorobenzyl isomers containing 2,3,6-trichlorobenzyl chloride is used, the quantity of reactants should be based on the total amount of the isomers to assure the maximum possible yield of 2,3,6-trichlorobenzoic acid. With conditions such as to produce unduly low yields, there is a tendency to produce preferentially the isomers other than the 2,3,6-trichlorobenzoic acid so that the resulting mixed isomers of trichlorobenzoic acid may contain a lower percentage of 2,3,6-trichlorobenzoic acid than the percentage of 2,3,6-trichlorobenzyl chloride present in the mixed isomers of trichlorobenzyl chloride charged to the reaction. This probably results from the fact that the spatial arrangement in the 2,3,6-isomer renders it relatively non-reactive.

*Example I*

The following mixture was refluxed for one hour:

46.0 g. (0.2 mole) trichlorobenzyl chloride,
16.8 g. (0.21 mole) 50% aqueous sodium hydroxide,
138.0 ml. methanol.

The trichlorobenzyl chloride was a mixture of isomers containing a major amount of 2,3,6-trichlorobenzyl chloride and a minor amount of the other isomers. The reaction mixture was filtered to separate the precipitated sodium chloride and then the filtrate was evaporated to dryness under partial vacuum. The residue (trichlorobenzyl hydrolysate) was mixed with 12 g. of acetic acid (solvent), 5 g. of fuller's earth and 108 g. of 70% nitric acid. The mole ratio of nitric acid to hydrolysate was 6:1. This mixture was refluxed for 8 hours, cooled and poured into 500 ml. of water. This aqueous mixture was extracted with 425 ml. of benzene. The benzene extract was washed with 100 ml. of water and then shaken with one 200 ml. portion and then with one 50 ml. portion of 5% sodium hydroxide to convert the trichlorobenzoic acid to the water soluble sodium salt. The aqueous alkaline extract was mixed with 50 ml. of 36% hydrochloric acid, cooled to 15° C. and filtered to separate the trichlorobenzoic acid. The product was washed with 100 ml. of water and dried in a vacuum oven at 45-50° C. The dried product weighed 20.2 g. (44.8% yield based on the trichlorobenzyl chloride) and was a mixture of isomers containing a major amount of 2,3,6-trichlorobenzoic acid and a minor amount of other isomers of trichlorobenzoic acid. This mixture may be used as a herbicide with or without upgrading or purification.

*Example II*

This run was made the same as described in Example I except that the molar ratio of nitric acid to hydrolysate (calculated as trichlorobenzyl alcohol) was 12 to 1. The product weighed 24.4 g. (54.3% yield).

*Example III*

The following mixture was refluxed for 6 hours:

46.0 g. (0.2 mole) trichlorobenzyl chloride (mixed isomers like that of Example I),
16.5 g. (0.25 mole) 85% potassium hydroxide pellets,
200 ml. anhydrous ethanol.

The only water present in the above reaction mixture was the moisture in the potassium hydroxide pellets, about 1.7 g. The mixture after refluxing was poured into 500 ml. of water and this mixture was extracted with one 200 ml. and two 100 ml. portions of ether. The hydrolysate-containing ether extract was dried over sodium sulfate, filtered and evaporated to dryness. The crude hydrolysate (45.8 g.) was mixed with 216 g. of 70% nitric acid and 5 g. of fuller's earth and refluxed for 24 hours. The reacted mixture was poured into 500 ml. of benzene. The benzene extract was washed with two 50 ml. portions of water and then with one 50 ml. portion of 5% aqueous sodium hydroxide. The alkaline extract was mixed with 50 ml. of 36% hydrochloric acid, cooled to 15° C. and then filtered to separate the precipitated trichlorobenzoic acid. The product was washed with water, filtered and dried at 45° C. in a vacuum oven. The product weighed 25.5 g. (56.8% yield based on the trichlorobenzyl chloride charged) and was a mixture of isomers containing a major amount of 2,3,6-trichlorobenzoic acid and a minor amount of the other isomers of trichlorobenzoic acid.

While the trichlorobenzyl chloride used in the foregoing examples was a mixture of isomers, it is to be understood that pure or relatively pure 2,3,6-trichlorobenzyl chloride may be used as the starting material in which case the product will be 2,3,6-trichlorobenzoic chloride containing no other isomers or a small amount of other isomers.

I claim:

1. In the process of producing 2,3,6-trichlorobenzoic acid, the steps comprising hydrolyzing 2,3,6-trichlorobenzyl chloride with sodium hydroxide while dissolved in a solvent and in the presence of water to produce a trichlorobenzyl hydrolysate, and treating the trichlorobenzyl hydrolysate with 60-85% nitric acid to form 2,3,6-trichlorobenzoic acid, the amount of nitric acid being at least as large as 6 moles of nitric acid per mole of hydrolysate calculated as trichlorobenzyl alcohol.

2. In the process of producing 2,3,6-trichlorobenzoic acid, the steps comprising hydrolyzing 2,3,6-trichlorobenzyl chloride with potassium hydroxide while dissolved in a solvent and in the presence of water to produce a trichlorobenzyl hydrolysate, and treating the trichlorobenzyl hydrolysate with 60-85% nitric acid to form 2,3,6-trichlorobenzoic acid, the amount of nitric acid being at least as large as 6 moles of nitric acid per mole of hydrolysate calculated as trichlorobenzyl alcohol.

3. In the process of producing 2,3,6-trichlorobenzoic acid, the steps comprising hydrolyzing 2,3,6-trichlorobenzyl chloride with at least one mole of sodium hydroxide per mole of said chloride while dissolved in a solvent and in the presence of water to produce a trichlorobenzyl hydrolysate, and heating and oxidizing the hydrolysate with 60-85% nitric acid at reflux temperature and under atmospheric pressure and while dissolved in a lower aliphatic monocarboxylic acid containing 1-4 carbon atoms to form 2,3,6-trichlorobenzoic acid, the amount of nitric acid initially present being at least 6 moles per mole of hydrolysate calculated as trichlorobenzyl alcohol.

4. In the process of producing 2,3,6-trichlorobenzoic acid, the steps comprising hydrolyzing 2,3,6-trichlorobenzyl chloride with at least one mole of sodium hydroxide per mole of said chloride while dissolved in a solvent and in the presence of water to produce a trichlorobenzyl hydrolysate, and heating and oxidizing the hydrolysate with 60-85% nitric acid at reflux temperature and under atmospheric pressure while dissolved in acetic acid to form 2,3,6-trichlorobenzoic acid, the amount of nitric acid initially present being at least 6 moles per mole of hydrolysate calculated as trichlorobenzyl alcohol.

5. In the process of producing 2,3,6-trichlorobenzoic acid, the steps comprising hydrolyzing 2,3,6-trichlorobenzyl chloride with sodium hydroxide while dissolved in a solvent and in the presence of water to produce a trichlorobenzyl hydrolysate, and oxidizing the hydrolysate with 60-85% nitric acid in the presence of 5 to 15% fuller's earth based on the weight of the hydrolysate to form 2,3,6-trichlorobenzoic acid.

6. In the process of producing 2,3,6-trichlorobenzoic acid, the steps comprising heating and reacting trichlorobenzyl chloride mixed isomers containing a major amount of 2,3,6-trichlorobenzyl chloride while dissolved in a water soluble, monohydric, lower aliphatic alcohol containing water with one mole of sodium hydroxide per mole of trichlorobenzyl chloride and to hydrolyze the trichlorobenzyl chloride and form trichlorobenzyl hydrolysate, and thereafter heating and reacting the hydrolysate at reflux temperature under atmospheric pressure and while dissolved in acetic acid with at least 6 moles of 60-85% nitric acid per mole of hydrolysate calculated as trichlorobenzyl alcohol to oxidize the hydrolysate and form a mixture of trichlorobenzoic acid isomers containing a major amount of 2,3,6-trichlorobenzoic acid.

7. In the process of producing trichlorobenzoic acid from trichlorobenzyl chloride, the steps comprising reacting trichlorobenzyl chloride with metal hydroxide selected from the group consisting of sodium hydroxide, potassium hydroxide, and calcium hydroxide, thereby forming a trichlorobenzyl hydrolysate, and oxidizing said hydrolysate with nitric acid and converting said hydrolysate to trichlorobenzoic acid.

8. In the process of producing 2,3,6-trichlorobenzoic acid, the steps comprising hydrolyzing 2,3,6-trichlorobenzyl chloride with metal hydroxide while dissolved in a solvent for the 2,3,6-trichlorobenzyl chloride and in the presence of water to form a 2,3,6-trichlorobenzyl hydrolysate, said metal hydroxide being selected from the group consisting of sodium hydroxide, potassium hydroxide and calcium hydroxide, and oxidizing said hydrolysate with 60-85% nitric acid at atmospheric pressure to form 2,3,6-trichlorobenzoic acid.

9. In the process of producing 2,3,6-trichlorobenzoic acid, the steps comprising hydrolyzing 2,3,6-trichlorobenzyl chloride with metal hydroxide while dissolved in a solvent for the 2,3,6-trichlorobenzyl chloride and in the presence of water to produce a trichlorobenzyl hydrolysate containing 2,3,6-trichlorobenzyl alcohol, said metal hydroxide being selected from the group consisting of sodium hydroxide, potassium hydroxide and calcium hydroxide, and the amount of said metal hydroxide containing at least one mole of hydroxyl ions per mole of 2,3,6-trichlorobenzyl chloride, and oxidizing such hydrolysate at reflux temperature and atmospheric pressure with 60-85% nitric acid to form 2,3,6-trichlorobenzoic acid, the amount of nitric acid being at least 6 moles of nitric acid per mole of such hydrolysate calculated as trichlorobenzyl alcohol.

References Cited in the file of this patent

UNITED STATES PATENTS

| | | |
|---|---|---|
| 1,601,509 | Putnam et al. | Sept. 28, 1926 |
| 2,563,820 | Darragh et al. | Aug. 14, 1951 |
| 2,740,811 | Lotz | Apr. 3, 1956 |

FOREIGN PATENTS

| | | |
|---|---|---|
| 655,074 | Great Britain | July 11, 1951 |

OTHER REFERENCES

Brimelow et al.: Chem. Ab., vol. 46, cols. 2002–3 (1952).